United States Patent [19]
Domenico

[11] 4,128,771
[45] Dec. 5, 1978

[54] DIGITALLY CONTROLLED POWER SYSTEM

[75] Inventor: Robert J. Domenico, Los Gatos, Calif.

[73] Assignee: Palyn Associates, Inc., San Jose, Calif.

[21] Appl. No.: 757,468

[22] Filed: Jan. 7, 1977

[51] Int. Cl.² .............................................. G05F 1/02
[52] U.S. Cl. .................................... 307/52; 323/17; 323/19
[58] Field of Search ...................... 323/17, 19, DIG. 1; 307/43, 52, 60, 57, 41, 150; 363/124; 235/151.21

[56] References Cited

U.S. PATENT DOCUMENTS

| | | | |
|---|---|---|---|
| 3,491,283 | 1/1970 | Johnston | 363/85 |
| 3,504,204 | 3/1970 | Carrive | 307/305 |
| 3,562,625 | 2/1971 | van den Broeck | 323/24 X |
| 3,605,002 | 9/1971 | Smyth | 307/150 |
| 3,702,434 | 11/1972 | Ryan | 323/20 |
| 3,783,366 | 1/1974 | Cox | 363/3 |
| 3,838,329 | 9/1974 | Michelet et al. | 323/17 |
| 3,879,647 | 4/1975 | Hamilton et al. | 363/16 |
| 3,921,059 | 11/1975 | Birman et al. | 323/21 |
| 3,952,240 | 4/1976 | Ruumpol | 323/1 |
| 4,001,728 | 1/1977 | Schneider | 340/347 M |
| 4,034,233 | 7/1977 | Leyde | 307/41 |

OTHER PUBLICATIONS

IBM Technical Disclosure Bulletin, "Integrated Binary Power Controller" Debrita et al., vol. 17, No. 8, Jan. 1975.
IBM Technical Disclosure Bulletin, "Analog Digital Transistor Switching Regulator Controller", Calvo et al., vol. 17, No. 9, Feb. 1975.
"Choose Switching Regulators for Your Computer Power Design", Electronic, Design 6, Mar. 15, 1975, Hnatec, pp. 54–58.

Primary Examiner—Robert K. Schaefer
Assistant Examiner—Morris Ginsburg
Attorney, Agent, or Firm—Flehr, Hohbach, Test

[57] ABSTRACT

A digitally controlled power system for controlling one or more power supplies having an output voltage including an analog to digital converter for sensing a difference between a reference voltage and the output voltage. Also included is a digitally controlled processor to provide a pair of control pulses to control the power supplies and a control memory to provide a program of instructions to said processor such that the processor provides a programmed change in the pulse width of the control pulses whereby the power supply provides a change in the output voltage.

27 Claims, 5 Drawing Figures

DIGITALLY CONTROLLED POWER SYSTEM

BACKGROUND OF THE INVENTION

Regulated power supplies have been a basic necessity in the electronics industry for many years. Early implementations achieved voltage regulation through the use of a series pass device that controlled the flow of current as a function of the demand of the load. This control was accomlished by sensing any change in output voltage caused by changing load requirements and feeding it back through analog control circuitry that could adjust the current flowing through the series pass device.

The major disadvantage of this early approach was that because the power supply operated at line frequency (60Hz) as the current rating of the supply increased, larger and larger iron transformers, filter capacitors, and iron chokes were required to handle the load requirements. In addition, the efficiency of power supplies based on the approach dropped significantly (as low as 20%) when low voltages were required.

Switching power supplies were developed to overcome these disadvantages. A typical switching power supply is shown and described in the manual entitled "JP Series Power Supplies, Technical Information", published by ACDC Electronics, Inc. In this approach, unregulated, high DC voltage (generally derived from a 110/220 volt, 60 Hz line) is chopped at a high frequency (typically, 20 Hz), stepped down through a ferrite transformer, and then rectified and filtered to obtain the desired DC output voltage. As in the earlier approach, regulation of the output voltage as load current varies is accomplished by feedback control using analog circuitry. Any deviation of the output voltage from its desired value produces an error signal. This signal is used to control the width of the pulses that chop the unregulated, high DC voltage. If the load current demand increases, the feedback control widens the pulse width thereby causing more energy to be transmitted through the transformer to the load. Conversely, the pulse width is narrowed if the load demand decreases.

The algorithm used for feedback control is almost always based upon proportional control. The error signal caused by a deviation in output voltage is compared against a voltage ramp. When the amplitude of the error signal and the voltage ramp are equal, the pulse is initiated. The pulse is always terminated at the end of the chopping cycle.

The main limitation of the analog implementation of this feedback control algorithm is that the switching power supply has limited ability to respond to large load current transients. Typically, a 50% change in load current produces a 5-10% change in output voltage before the control circuitry is able to return the output to within the regulation band. Furthermore, this recovery process usually requires a significant period of time. Power supply response to load transients can be improved by adding derivative control to the proportional control; however, this adds considerable complexity and cost to the power supply.

Analog feedback control systems have other disadvantages and limitations. First, they experience both short and long term stability problems because of component drift. Second, each output voltage to be regulated requires a dedicated analog control system. This means that power systems which produce multiple, independent, regulated output voltages must have an independent analog controller for each voltage. Since many contemporary applications require three to five independent voltages, duplicated analog circuitry contributed significantly to the cost of their power systems.

An ideal feedback control system would be one that could incorporate the advantages of proportional, derivative, and integral control for multiple, independent, regulated output voltages at low cost in a simple implementation that is relatively independent of component drift. The system would adapt to the needs of the external environment by using whatever control methods were appropriate for affecting a desired response. For example, it could use integral or proportional control when the load was relatively constant, and then instantly switch to derivative control when a transient occurs.

SUMMARY AND OBJECTS OF THE INVENTION

The present invention relates to a digitally controlled power system and method controlled during timed clock cycles and including at least one power supply responsive to a pair of control pulses each having a pulse width providing a controlled output voltage.

Included is an analog to digital converter for sensing the difference between a reference voltage and the output voltage. Also included is a digital control processor connected to receive and process the difference or error signal representative of the measured difference and to provide the control pulses to the power supplies. A control memory is connected to the processor to provide a program of instructions to the processor such that the processor provides a change in the width of the control pulses. The power supply thereby provides a programmed change in the output voltage in response to the change of the pulse width of the pair of control pulses.

The digital control processor is programmed through instructions in the control memory to perform all the control functions necessary to regulate the power supply. The processor determines from processing the error signal with one of the control methods at its disposal what pulse width should be applied to the power switches in the next cycle to correct the error.

The processor can perform other functions beyond the capability of any analog implementation of control. By sharing its resources, the processor can control multiple power supplies. Switching power supplies requires a fixed pulse width for an entire cycle. After the processor has computed the pulse width for one supply, it can proceed to service other supplies while the first is completing its cycle. The number of power supplies that can be serviced depends only upon the speed of the processor and the resolution time of the sensing means. The analog to digital converter is multiplexed to service all the power supplies under the control of the processor. An analog switch sequentially connects each supply and its reference voltage to the converter.

Many power systems with multiple supplies such as those used in large computers, memory systems, controllers, and peripherals require that the sequence of turning on and turning off of various voltages be precisely controlled. Since the processor has control over all the power supplies in the system, it is possible to accomplish this task with a program in control memory rather than with additional hardware. It is also possible to control the rate at which each of these voltages is turned on or off in order to protect the circuitry powered by the supplies.

There are many applications where voltage adjustments must be made in order to perform a diagnostic or test procedure. There is no automatic way to do this in any analog conrolled power supply without adding additional hardware. With digital control, however, it is possible to send the processor information from a remote source, possibly even the system being powered by the supplies controlled by the processor, to change the nominal voltage of any or all of these supplies.

The ability to connect power supplies in parallel is extremely limited with analog control. Generally, the power output of each supply is limited to less than its rated capability in order to prevent any one of the supplies from trying to support the entire load and thus exceed its design limits. Since the processor controls all of the power supplies, it is able to monitor the pulse widths of units connected in parallel and instantly detect whenever one of the suppliers is attempting to assume an over-proportional amount of the load demand. If this occurs, the processor would deliberately shorten the pulses to the overloaded supply and increase those to the other supplies in order to balance the current in each unit.

Programs can be placed in the control memory which will allow the processor to do self-diagnosis before turning on the power supplies in the system. If a malfunction is detected, an alarm may be issued to inform the operator.

It is therefore an object of the present invention to provide a digital control power system which can choose from a multiplicity of control alogrithms the one best suited to meet instantaneous control requirements.

It is another object to provide a digital control system that can control multiple independent power supplies without requiring additional control circuitry.

It is a further object to provide the capability of independently sequencing the turn on and turn off of multiple power supplies in a power system.

Additional objects and features of the invention will appear from the description in which the preferred embodiments of the invention have been set forth in detail in conjunction with the drawings.

DETAILED DESCRIPTION OF THE DRAWINGS

Figure 1:
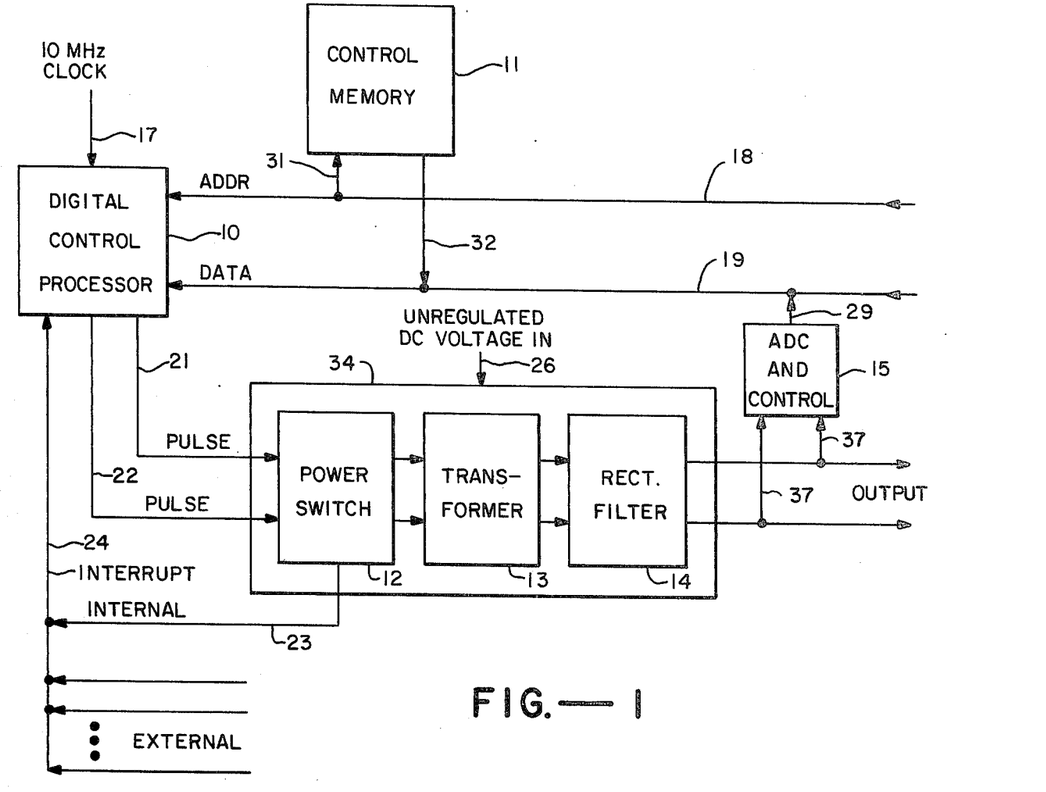
FIG. 1 shows a block diagram of the digitally controlled power supply.

Referring to FIG. 1, there is shown a block diagram of a digitally controlled power system. A conventional power supply 34 includes power switch 12, transformer 13, rectifier and filter 14 connected to an unregulated DC voltage source via bus 26. Units 12, 13 and 14 are common to all switching power supplies and their design is well known.

An analog to digital converter (ADC) and analog switch 15 is shown connected to power supply 34 via buses 37. The ADC is used to measure the deviation of the output voltage from its desired value and to transmit this difference (or error) back to DCP 10.

In FIG. 1, the digital control processor (DCP) 10 is connected to unit 15 via buses 29, 19. DCP 10 is shown in more detail in FIG. 3. DCP 10 is connected to control memory 11 via buses 18, 31, 19, 32. Control memory 11 is a 1K ROM for storing program instructions for DCP 10 to perform all the functions necessary to control the power supply 34. DCP 10 is clocked by a conventional 10 MHz clock via bus 17.

DCP 10 provides control pulses on buses 21, 22 to power supply 34 to regulate the output voltage. DCP 10 determines from processing the difference signal with one of the control methods at its disposal what pulse width should be applied to power switch 12 in the next cycle to correct the difference or error.

Bus 24 is for interrupt signals to the DCP 10. Internal interrupts from power supply 34 are transmitted to DCP 10 via buses 23, 34. Additional interrupt signals may be provided from external sources. For example, a host processor (not shown) may use an external interrupt line to signal the DCP 10 and then give a specific instruction to DCP 10 via buses 18, 19 to provide an instruction to control power supply 34.

Figure 2:
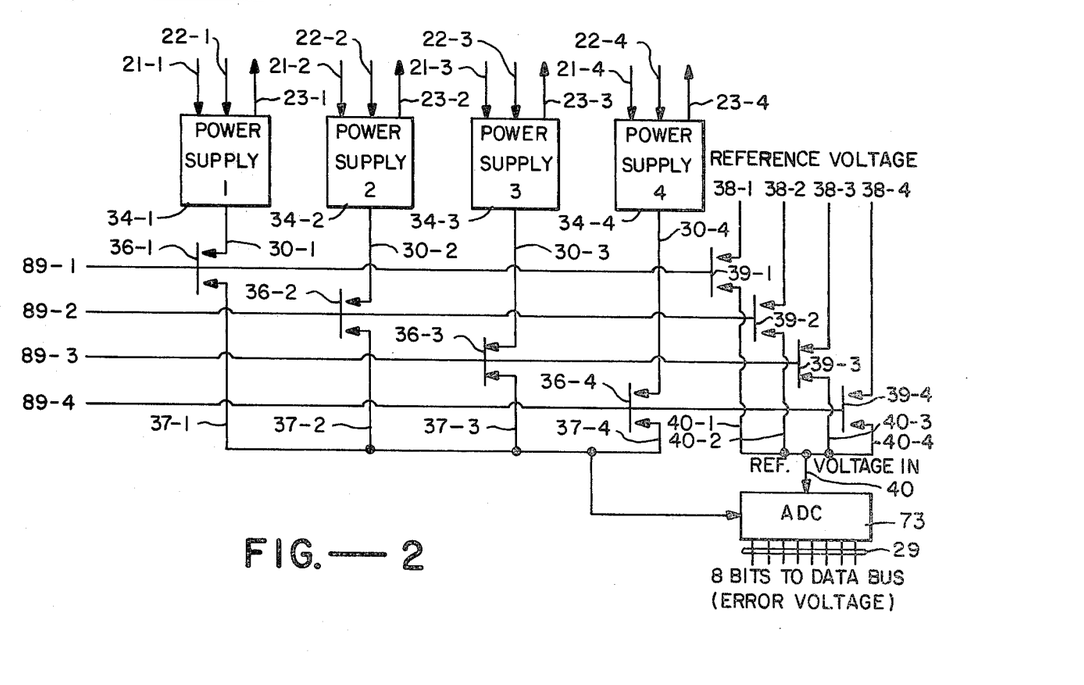
FIG. 2 shows a schematic representation of the analog to digital converter and analog switch of FIG. 1 for use with multiple power supplies.

Referring to FIG. 2, ADC and analog switch 15 of FIG. 1 is shown in more detail. FIG. 2 shows a typical connection which achieves digital control for four power supplies 34-1, 34-2, 34-3, and 34-4. The power supplies 34-1 to 34-4 are sequentially selected by DCP 10 of FIG. 1 to connect the proper power supply and its reference voltage 38-1, 38-2, 38-3, 38-4 to ADC 73. Power Supply 34-3 and reference voltage 38-3 are shown selected.

Control pulses are provided to the Power Supplies 34-1 to 34-4 from the DCP via buses 21-1 to 22-4. Interrupts are transmitted to DCP 10 on buses 23-1 to 23-4.

DCP 10 selectively activates analog switches 36-1, 39-1; 36-2, 39-2; 36-3, 39-3; and 36-4, 39-4 via power supply select lines 89-1 to 89-4. Such switches 36-1 to 36-4 and 39-1 to 39-4 can be field effect transistors (FET) which are selected one at a time by raising the voltage in the appropriate power supply select line while the remaining lines are low. In FIG. 2, FET 36-3, 39-3 are closed and connect the power supply 34-3 and reference voltage 38-3 to the analog voltage and reference voltage inputs of ADC 73 via buses 37-3, 37, 40-3, 40.

ADC 73 is a conventional analog to digital converter. It is used to measure the difference between a reference voltage and a power supply output voltage, hereinafter referred to as an error voltage, for each of the supplies under control of DCP 10 of FIG. 1. The method of converting this error to a binary number can be by the use of successive approximation or a tracking converter. Each of these methods is well known and described in numerous textbooks and journals, as, for example, in Application Notes of Precision Monolithics, Inc. entitled "A Low Cost, HighPerformance Tracking A/D Converter".

A preselected reference voltage 38-1 to 38-4 is used to scale the ADC 73 to the desired output voltage of the power supply being monitored. The ADC 73 converts the error voltage to its binary equivalent and outputs it on 8 bit data bus 29 to DCP 10 of FIG. 1. When the binary number is received by the DCP 10 it disconnects the power supply and selects the next switch.

The degree of accuracy and the window of error sensing is related to the number of binary bits used in ADC 73 to convert the error. In a preferred embodiment an 8 bit binary number is used giving a range of ± 128 millivolts with an accuracy of ± 2 mv. One has the option of enlarging the window at the expense of accuracy (± 256 mv with an accuracy of ± 4 mv) or conversely reducing the window and increasing the accuracy.

Since the ADC senses all of the voltages, it is possible to obtain a decimal readout of each of the voltages by adding a display unit.

Figure 3:
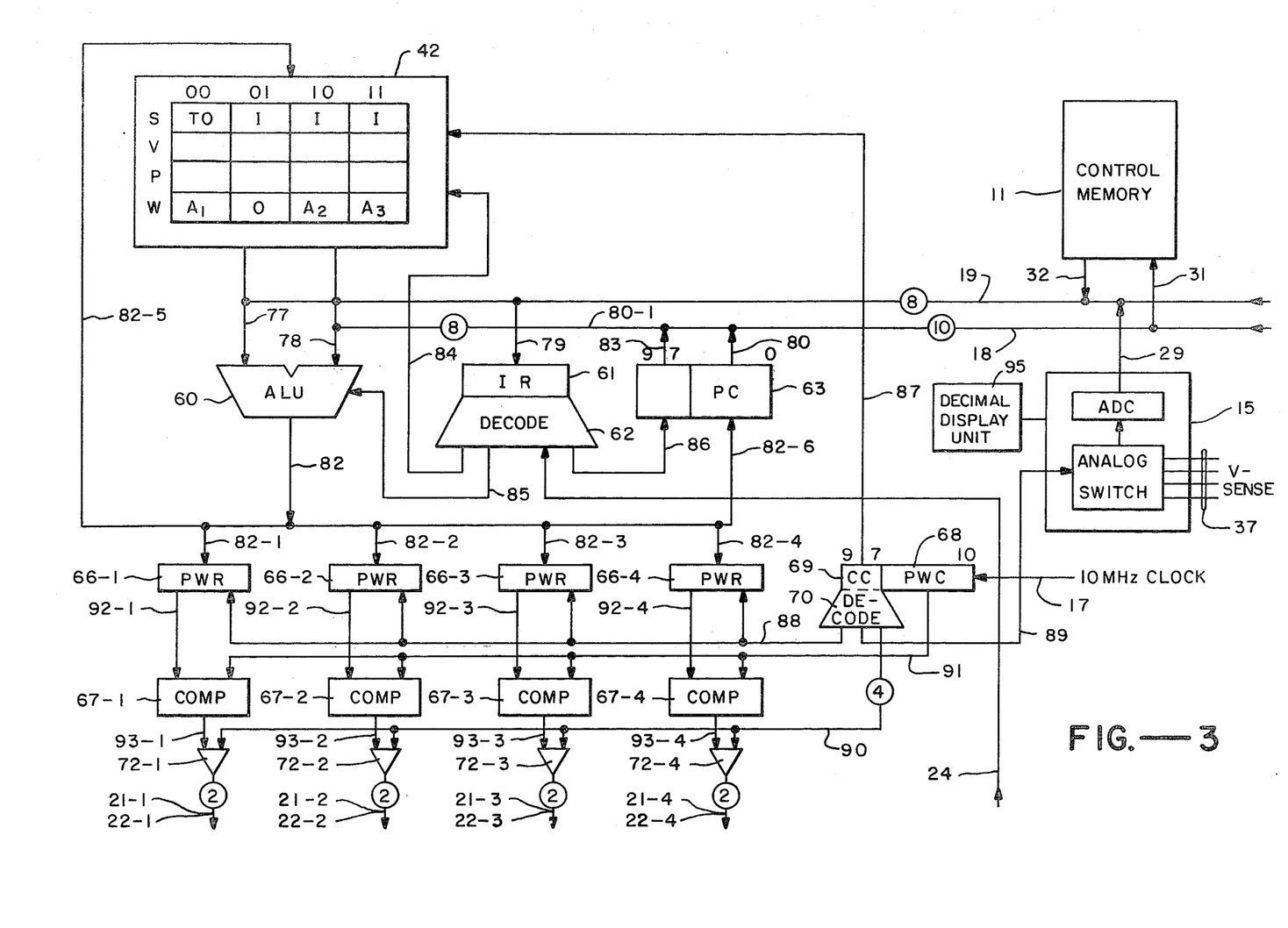
FIG. 3 shows a schematic representation of the digital control processor of FIG. 1.

Referring to FIG. 3, the DCP 10 is shown for operation with four power supplies. Control memory 11 is a 1K ROM connected to DCP 10 via eight-bit bus 32, 19 and 10-bit bus 18, 31.

DCP 10 includes a conventional register file 42 containing four banks of four word X eight bit registers. Each bank is assigned to a power supply and is used to store data and addresses.

Typically, Bank 00 would be assigned to power supply 34-1 of FIG. 2, Bank 01 to 34-2, Bank 10 to 34-3, and Bank 11 to 34-4. DCP 10 also includes a conventional arithmetic logic unit (ALU) 60 connected to register file 42 via eight bit bus 82-5 and from register file 42 via buses 77, 78. The arithmetic and logic unit 60 performs arithmetic and logical functions between any two registers in a bank of register file 42 or on a single register. All data and addresses coming from control memory 11 via eight bit buses 32, 19 are loaded through ALU 60.

Instruction register (IR) 61 and decoder 62 are conventional units connected to control memory 11 via bus 32, 19, 79. IR 61 and decoder 62 are connected to RF 42 and ALU 60 via buses 84, 85. Decoder 62 also has inputs on bus 24 from all interrupt sources of FIG. 1 as previously described.

Program counter (PC) 63 is a 10 bit binary counter used to generate the address of the instruction to be fetched from control memory 11. PC 63 connected to control memory 11 via two bit bus 83, eight bit bus 80, and 10 bit buses 18, 31. Control memory 11 is organized into 4 banks of 256 words each. The two high order bits 8, 9 of PC 63 allow the processor to address a particular bank. Bits 0-7 of PC 63 address a location within the bank defined by bits 8, 9. The high order bits of PC 63 are loaded by decoder 62 via 2 bit bus 86.

Pulse width registers (PWR) 66-1, 66-2, 66-3, 66-4 are conventional eight bit registers to hold the value of a pulse width computed for each power supply. ALU 60 is connected to PWR 66-1 to 66-4 via bus 82-1 to 82-4. ALU 60 is connected to PC 63 via bus 82-6.

Pulse width counter (PWC) 68 is an eight bit counter driven by a 10 MHz clock via bus 17. PWC 68 is reset when it reaches a count of 127. This allows the pulse width to be defined in increments of 100 nsec up to a maximum of 12.7 usec.

Control counter (CC) 69 is a 2 bit counter whose count is used to address PWR 66-1 to 66-4, ADC and Switch 15, Comparator 67-1 to 67-4, and to determine the RF 42 bank address. It is driven from PWC 68 is incremented each time PWC 68 is reset. Thus, CC 69 will increment once each 12.7 usec.

Comparators (COMP) 67-1, 67-2, 67-3, 67-4 are exclusive-OR gates used to compare the value of a pulse width loaded into PWR 66-1 to 66-4 with the count in the PWC 68. The contents of PWR 66-1 to 66-4 and PWC 68 are transmitted to comparators 67-1 to 67-4 via buses 92-1 to 92-4 and 91 respectively. When the comparison is started, the output of COMP goes high. When they are equal the output of the COMP goes low and the pulse is terminated. Since two pulses are required by the switching transistors in the power switch 12, the comparison is performed twice in a 50.8 usec cycle. Each comparison is separated by 25.4 usec or two counts of CC 69.

The output of comparators 67-1 to 67-4 is transmitted to buffer drivers 72-1, 72-2, 72-3, 72-4 via buses 93-1 to 93-4. The buffer drivers 72-1 to 72-4 are selectively activated by decoder 70, a typical decoder controlled by CC 69. Decoder 70 selectively addresses PWRs 66-1 to 66-4, buffer drivers 72-1 to 72-4, and the analog switch of FIG. 2 via bus 88, 89, 90.

Referring to FIG. 3, a map of register file 42 is shown. Each bank includes four eight bit registers which are identified as save or sequencing (S) register, error voltage (V) register, pulse width (P) register, and working (W) register for each bank.

The data flow and control of the DCP 10 will be described in conjunction with FIG. 3. The RF 42 contains four banks of four word × eight bit registers. Each bank is assigned to a power supply and is used to store data and addresses. All operations such as arithmetic, load and other operations are performed using these registers.

The ALU 60 performs arithmetic functions between any 2 registers or on a single register. All data and addresses coming from control memory 11 to RF 42 are loaded through ALU 60. Data coming from RF 42 to PWR 66-1 to 66-4 and addresses to program counter (PC) 63 are loaded through ALU 60.

PC 63 is used to generate the address of the instruction to be fetched from control memory 11. After the instruction is fetched, the PC 63 is incremented by one and the counter is pointing to the next instruction to be fetched. PC 63 may also be loaded from RF 42 to allow branching to other routines in control memory 11.

IR 61 is loaded from control memory 11 and contains the instruction to be decoded and executed by decoder 62. The instructions to be defined are in terms of an eight bit field. These bit patterns are decoded and the signals control the flow of data through the DCP 10. The format for the instruction set is set forth in Chart I.

CHART I

| BITS | 7 | 6 | 5 | 4 | 3 | 2 | 1 | 0 | Instruction |
|---|---|---|---|---|---|---|---|---|---|
| | 0 | 0 | X | X | X | X | X | X | Arithmetic |
| | 0 | 1 | X | X | X | X | X | X | Move over boundary |
| | 1 | 0 | X | X | X | X | X | X | |
| | 1 | 0 | 0 | 0 | X | X | X | X | |
| | | | | | 0 | X | X | X | Load Immediate |
| | | | | | 1 | X | X | X | Branch |
| | | | 0 | 1 | X | X | X | X | Inc., Dec., Comp. |
| | | | 1 | 0 | X | X | X | X | |
| | | | | | 0 | X | X | X | Set M |
| | | | | | 1 | X | X | X | Wait |
| | | | 1 | 1 | X | X | X | X | Halt |
| | 1 | 1 | X | X | X | X | X | X | Move |

Referring to Chart I, the decoder 62 of FIG. 3 first looks at the two higher order bits to determine what type of instruction is to be executed.

If Bits (7, 6) are 0, 0, it is an arithmetic function. The next two bits determine the type of function and the last four bits give the relative address of the destination (DST) and source (SRC) registers of the register file 42 of FIG. 3. The four registers in RF file 42 are sequencing (S) register, error voltage (V) register, pulse width (P) register, and working (W) register. The arithmetic functions to be performed are addition (ADD), subtract (SUB), and compare (CMP).

If bits (7, 6) are 0, 1, it is a move over boundary (MOB) instruction. Bits (2-5) give the absolute address of the DST register (Bank and Register), and bits (0, 1) the relative address of the SRC register. Since all instructions operate relative to the power supply being serviced and are addressed relative to the control counter 69 of FIG. 3, an instruction is required which will move information across register boundaries. The destination register is addressed directly while the source register is addressed relative to the control counter.

If bits (7, 6) are 1, 0, then the next two bits (5, 4) are examined. If bits (5, 4) are 0, 0, then the next bit (3) is examined. If it is a 0, then the instruction is load immediate (LI) which is used to load instruction data or address stored in next location in control memory 11 into the destination register defined in the DST field. Bits 2-0 are the address of the DST register and include the S, V, P and W registers of the Register File 42 and the PWR 66-1 to 66-4.

If bit (3) is a 1, then the instruction is a branch (BXXX) and bits (2-0) determine the type of branch. Branch instructions allow the program to jump to a new location in memory unconditionally or as the result of a condition test. When a branch occurs, the next address in memory is the location to which the program counter will point. If the test is not successful, the program counter will point to the location immediately following this location. The branch instructions are as follows: unconditional (BU), positive (BPLUS), negative (BNEG), zero (BZERO), overflow (BOF), overload (BOVLD), and power off (BNPO).

If bits (5, 4) are 0, 1, then the instruction is an increment (INC), decrement (DCR), or complement (CMR). Bits (3, 2) determine which type and bits (1, 0) are the relative address of the DST. These operations are used to increment, decrement and complement the data in a register and return it to the same register.

In Chart I, if bits (5, 4) are 1, 0, then bit (2) is examined. If it is 0, then the instruction is SET M. Since the data path in the DCP is defined as 8 bits, it is necessary to define an instruction which will allow the processor to address memory space greater than 256 words. The two higher order bits of PC 63 in FIG. 3 are loaded with this instruction allowing up to 1024 words of control memory 11 to be addressed.

If bit 2 is a 1, then the instruction is WAIT. This instruction halts the DCP and waits for the next 12.5 usec clock pulse to restart. When this occurs, the address in the program counter is used to fetch the next instruction.

If bits (5, 4) are 1, 1 then the instruction is HALT. This instruction halts the DCP and there is no restart until an interrupt such as power on is initiated.

If bits (7, 6) are 1, 1, then the instruction is a move (MOV) where bits (5-3) are the DST address and bits 2-0 are the SRC address. These instructions are used to move data into the registers from ADC, exchange data and address in the registers of a bank, move data out to the PWR 66-1 to 66-4, and addresses to the PC 63.

A typical program exemplary for the operation of the present embodiment is shown in Chart II. The programs for sequencing, regulating, turning off normal and emergency off are stored in control memory 11 of FIG. 3. The program has an initialization routine stored at location zero and is used to set up the status of the system when power on is first initiated. Power on resets all registers, PC 63 and CC 69 to 0. When this occurs the program starts at location 0 and tests for overload interrupt, or turn off interrupt. If neither of these conditions exists, then the program begins the initialization routine.

Referring to Chart II, if the initialization routine INIT 4 is followed for a turn on sequence of 0-3-2-1, the registers would be loaded as shown in RF 42 of FIG. 3. It should be noted that CC 69 was set to (0, 0) and PC 63 is now at 4 when the initialization started. When initialization is completed, the CC 69 was back to 0, 0 and the next instruction loads the contents of the S register in bank 0, 0 into PC. When this cycle is complete, CC 69 is incremented to (0, 1) and the S register in bank 01 is loaded to the PC 63. This is an idle routine and power is not turned on. The sequence is continued until power supply 0 is fully on.

CHART II

| ROM MAP | Instruction | Explanation |
|---|---|---|
| | | Power on resets all registers, PC, and CC. Interrupt forces PC←O, CC←O. |
| 0: | BOVLD | Branch to current overload routine. |
| 1: | OVLD | |
| 2: | BNPO | Branch to turnoff. |
| 3: | OFF | |
| INIT 4: | LI S | Set up sequencing order |
| | TO | First supply to turn on has TO (start |
| | LI W | of turn on routine) in S. Other |
| | A1 | supplies get 1 (location of idle routine). |
| | WAIT | W registers receive pointers to routines |
| | LI S | which establish turn on order via move |
| | I | accross bank instruction (MOB); e.g. |
| | LI W | $W_O$ is loaded with location A, which |
| | O | contains an MOB $S_3$, S. When supply O |
| | WAIT | reaches regulation, $S_3$ is loaded with |
| | LI S | $T_O$ so it turns on next. |
| | I | |
| | LI W | |
| | $A_2$ | |
| | WAIT | |
| | LI S | |
| | I | |
| | LI W | |
| | $A_3$ | |
| | WAIT | |
| | MOV PC, S | Load starting address on routine to service first supply. (Could be TO for turn on or I for idle.) |
| TO: | INR P | Increment pulse width |
| | MOV PWR, P | Load pulse width register |

CHART II-continued

| ROM MAP | Instruction | Explanation |
|---|---|---|
| | MOV V, ADC | Load ADC value |
| | BPLUS | Branch to setup regulation routine if |
| | SREG | error in goes pos. |
| I: | WAIT | Idle loop |
| | MOVE PC, S | Service next supply |
| SREG: | MOV PC, W | Set up pointer to TO for next |
| | LI S | supply to be turn on. |
| | R1 | Load starting address of regulation |
| | WAIT | routine. |
| | MOV PC, S | Service |
| $A_1$: | MOB $S_3$, S | Move TO into save area of next supply |
| | BU | to turn on |
| | SREG + 1 | |
| $A_2$: | MOB $S_1$, S | |
| | BU | |
| | SREG + 1 | |
| $A_3$: | MOB $S_2$, S | |
| | BU | |
| | SREG + 1 | |
| RI: | MOV W, V | Save VE(O) in working reg. |
| | MOV V, ADC | Read VE(n) |
| | CMR W | |
| | ADD W, V | Compute $\Delta V = VE(n) - VE(O)$ |
| | SUB P, W | Compute $PW(n) = PW(O) - \Delta V$ |
| | ADD W, V | Form $\Delta V + VE(n)$ |
| | CMR W | |
| | ADD W, P | Compute pulse width = $PW(n) - \Delta V - VE(n)$ |
| | BOVFL | Is pulse width $> +127$ |
| | OVFL | |
| | BNEG | Is pulse width $<0$ |
| | NEG | |
| | MOV PWR, W | Load pulse width register |
| $E_2$: | LI S | Starting address of second phase of |
| | $R_2$ | regulation routine |
| | WAIT | |
| | MOV PC, S | |
| OVFL: | LI PWR | Load maximum pulse width (127) |
| | 127 | |
| | BU | |
| | E2 | |
| NEG: | LI PWR | Load minimum pulse width (O) |
| | O | |
| | BU | |
| | E2 | |
| $R_2$: | MOV PWR, P | Load pulse width |
| | LI S | Starting address of third phase of |
| | $R_3$ | regulation routine |
| | WAIT | |
| | MOV PC, S | |
| $R_3$: | MOV V, ADC | Read ADC |
| | MOV PWR, P | Load pulse width |
| | LI S | Load starting address of first phase |
| | $R_1$ | of regulation routine |
| | WAIT | |
| | MOV PC, S | |
| OVLD: | LI PWR | Set all pulse width registers to zero |
| | O | |
| | WAIT | |
| | LI PWR | |
| | O | |
| | WAIT | |
| | LI PWR | |
| | O | |
| | WAIT | |
| | LI PWR | |
| | O | |
| HLT: | HALT | |
| OFF: | LI S | Initialize turnoff sequence |
| | I | |
| | LI W | |
| | O | |
| | WAIT | |
| | LI S | |
| | TF | |
| | LI W | |
| | $B_1$ | |
| | WAIT | |
| | LI S | |
| | I | |
| | LI W | |
| | $B_2$ | |
| | WAIT | |
| | LI S | |
| | I | |
| | LI W | |
| | $B_3$ | |
| | WAIT | |
| | MOV PC, S | |
| TF: | DCR P | Decrement pulse width |
| | MOV PWR, P | Load pulse width register |
| | BZERO | |
| | FREG | Finish regulation |
| | WAIT | |

CHART II-continued

| ROM MAP | Instruction | Explanation |
|---|---|---|
| | MOV PC, S | |
| B$_1$: | MOB S$_2$, S | Move into save area of next supply |
| | BU | to turn off. |
| | FREG + 1 | |
| B$_2$: | MOB S$_3$, S | |
| | BU | |
| | FREG + 1 | |
| B$_3$: | MOB S$_O$, S | |
| | BU | |
| | FREG + 1 | |
| FREG: | MOV PC, W | Set up pointer to TF for next supply |
| | LI S | to be turned off. |
| | I | |
| | WAIT | |
| | MOV PC, S | When all supplies are down, DCP sets in idle loop. |

Referring to Chart II, the initialization routine INIT 4 operates as follows.

Instruction LI S is a load immediate instruction which will set up a sequencing order. The first supply to be turned on has routine TO (start of turn on routine) in the S register. The other supplies get the routine I (location of idle routine).

The TO routine will increment the P register by 1, load the pulse width PWR with that value, and load the ADC value into the V register of RF 42. The pulse width will initially have a negative value with respect to the reference voltage.

After many cycles, the power supply will reach regulation and the system will branch to routine SREG. Routine SREG will set up a pointer to routine TO to turn on the next supply.

Instruction LI W will load a W register with pointers to routines which establish turn on order via MOB instructions. Here, register W0 is loaded with location A1, which contains MOB S3, S. When supply 0 reaches regulation, S3 is loaded with TO so it turns on next. Registers S2 and S1 are loaded in a similar fashion.

When power supply 0 is fully on, the address for the regulation routine R is loaded into S register of bank (0, 0). The next time CC equals (0, 0), the contents of W register are moved to the program counter and the next power supply to be turned on (power supply 3) is pointed to. The above is repeated until all supplies are on an in regulation.

The regulation routine is accomplished in three steps.

Routine R1 computes the derivative or slope ($\Delta$V) of the error voltage saving the old error voltage [VE(o)] for a clock cycle into the W register and reads the new error voltage [VE(n)] into the V register and then computes $\Delta$V=VE(n)−VE(o). Then the new pulse width PW(n) is computed by PW(n)=PW(o)−$\Delta$V. This is saved in the P register.

The $\Delta$V is added to the new error voltage [$\Delta$V+VE(n)] and the sum is subtracted from the pulse width [PW(n)] stored in the W register. The result is tested to determine if the number is greater than 127 or less than 0. If it is not, the number in the W register then is moved to the PWR. If it is greater than 127, 127 is placed in the PWR. If it is less than 0, a zero is placed into the PWR.

Routine R2 will load the PWR with the contents of the P register.

Routine R3 uses the same value in the PWR that was used in R2. In addition, routine R3 will read the difference voltage on Bus 29 of FIG. 3 from ADC to the V register. This voltage will be VE(o) during routine R1.

The processor will return to routine R1 during normal operation.

The routine OFF in conjunction with routines TF, B1, B2, B3 and FREG, are a turn off operation which can be analyzed in a manner similar to the initialization routine already discussed.

The operation of the present invention will be described in conjunction with FIGS. 3, 4, 5 and Chart II.

Figure 4:
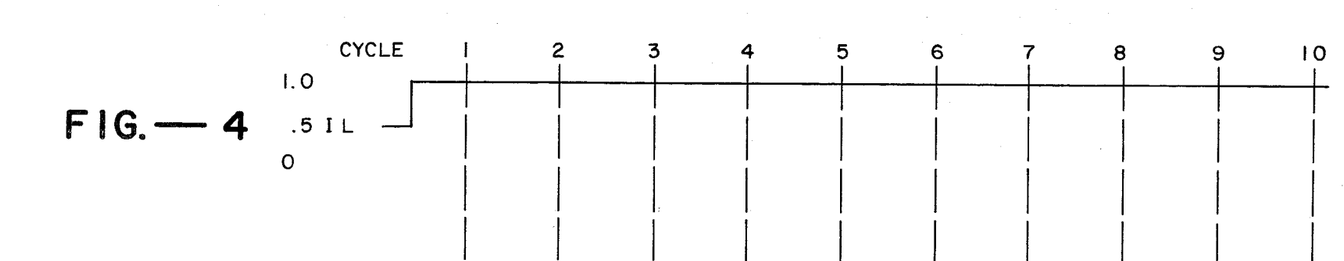
FIGS. 4 and 5 are timing diagrams representative of voltage regulation over 10 clock cycles by the digital control processor.

FIG. 4 shows an example of an increase in load current for a typical power supply from half load to full load over a period of 10 clock cycles. FIG. 5 shows an example of a worst case analysis over 10 clock cycles of the operation of the system for one of the power supplies of FIG. 3.

Figure 5:
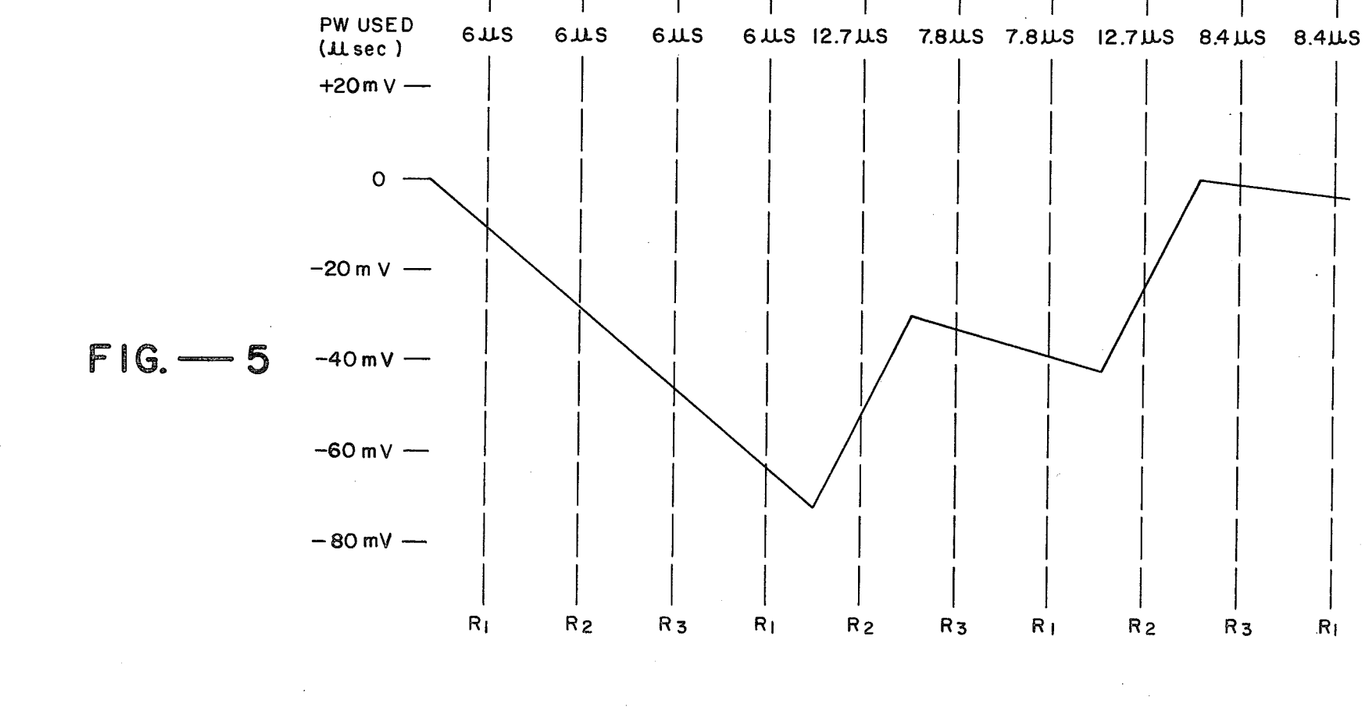

Assume that the system is operational and is entering routine R1 at the beginning of clock cycle 1 as shown in FIG. 5, and that the load current IL of FIG. 4 goes to full load at that time.

Assume further that the system has been operating with a pulse width of 6 usec for power supply 34-3 of FIG. 2, and that PWR 66-3 of FIG. 3 has been providing a pulse width of 6 usec. This pulse width is compared during the selected clock cycle with the count in PWC 68 via comparator 67-3. The control pulse is output via buffer driver 72-3 to the power supply 34-3.

When the selected power supply goes to full load as shown in FIG. 4, the processor is in routine R1. In FIG. 5, the difference voltage immediately begins to fall below 0 volts. Assuming no error voltage had been detected until this time, the processor will continue through clock cycles 1 and 2 as if nothing has happened. Therefore, a pulse width of 6 usec will be provided.

The processor will continue through routines R1 at clock cycle 1, R2 at clock cycle 2, and into R3 at clock cycle 3. During clock cycle 3, the processor is in routine R3 and now will read the ADC voltage as previously described via bus 29 in FIG. 3. The processor now detects an error and will begin to compensate for this error.

During routine R3, the ADC value is loaded into the V register of Register File 42 for Bank 10.

In FIG. 5, the processor enters routine R1 during clock cycle 4, in which it computes a rate of change of voltage by calculating $\Delta$V. As previously described, $\Delta$V equals the new voltage error VE(n) minus the old voltage error VE(o). A new pulse width is now computed by calculating PW (0) minus $\Delta$V. Thus the processor has provided derivative control for the regulation of the power supply.

Also formed will be $\Delta$V+VE(n) for use in computing whether a recovery control pulse width is required.

During routine T1, the processor also will compute whether the pulse width is greater than 127 or less than 0 by the calculation PW(n)−ΔV−VE(n). Thus, in a worse case analysis, the processor then effectively will predict where the error voltage will be at the end of routine R1 when the correction is made. Thus, the processor is providing proportional control for regulation in addition to derivative control.

If the pulse width is greater than 127, the processor via routine OVFL of Chart II will load the PWR with pulse width of 125.

In FIG. 5, at the start of clock cycle 5, assume that the difference or error voltage is approximately −72 millivolts. The processor will calculate that a pulse width of 12.7 usec should be loaded into PWR 66-3 and this will be supplied to the power supply 34-3 during clock cycle 5. The application of this control pulse is a recovery pulse that will reduce the error voltage to approximately −28 mv at the end of cycle 5. Also during R1, the processor will calculate the pulse width to be applied during clock cycles 6 and 7. Assume that the value calculated is 7.8 usec.

During clock cycles 5 and 6, the processor enters routines R2, R3 which will apply a regulation pulse width of 7.8 usec as calculated during clock cycles 6 and 7.

During clock cycle 7, the processor reenters routine R1 and calculates another recovery pulse if required and a regulation pulse. The recovery pulse will be applied during clock cycle 8, having the maximum 12.7 usec pulse.

Assuming the processor calculated a regulation pulse of 8.4 usec, this pulse will be applied during clock cycles 9 and 10 in conjunction with routines R2 and R3.

Thus, after clock cycle 10, the processor is effectively regulating the power supply 34-3 by supplying the proper pulse width (here 8.4 usec for full load operation).

FIG. 5 represents a worst case analysis in which the processor was entering routine R1 at the time of a change in load current. The processor will detect this error in routine R3 and will immediately begin to compensate by predicting where the error will be when a correction is made during routine R1. If necessary, the processor will provide a maximum recovery pulse of 12.7 usec during the clock cycle following routine R1. The clock cycles corresponding to routines R2 and R3 will provide a calculated regulation pulse.

If the change in load demands had occured at a time when the processor was about to begin routine R3, the processor would commence a faster regulation routine.

Thus, the processor has looked at the rate of change (ΔV) of the error signal and the proportional error and uses both concepts for regulation.

Although the system has been shown incorporating a derivative and proportional control, it could be adapted to the needs of an external environment by using whatever control methods were appropriate for effecting a desired response. For example, the system could use integral or proportional control when the load was relatively constant and then be instantly switched to derivative control when a transient occurs.

Also, the system could be adapted to include a differentiator to differentiate the leading and/or trailing edge of the control pulses, thereby forming start and stop pulses. Start and stop pulses are typically used in prior art switching power supplies as previously described.

What is claimed is:

1. A digitally controlled power system controlled during timed clock cycles comprising:
   at least one power supply responsive to a pair of control pulses each having a pulse width providing a controlled output voltage,
   means for sensing a difference between a reference voltage and said output voltage whereby said means provides an error signal representative of said difference,
   digital control processor means connected to receive and process said error signal and to provide said pair of control pulses during said clock cycles,
   and control memory means connected to said processor means to provide a program of instructions to said processor means such that said processor means provides a programmed change in the width of said control pulses whereby said power supply provides a change in said output voltage.

2. A system as in claim 1 wherein said means for sensing includes analog to digital converter means for converting said error signal to a binary signal representative of a binary number.

3. A system as in claim 2 wherein said program of instructions includes a program for proportional control of said control pulses.

4. A system as in claim 2 wherein said program of instructions includes a program for derivative control of said control pulses.

5. A system as in claim 2 wherein said program of instructions includes a program for integral control of said control pulses.

6. A system as in claim 2 wherein said program of instructions includes a time of day clock program for turning on or off said power supply.

7. A system as in claim 2 wherein said processor means includes program counter means for generating the address of an instruction to be fetched from said control memory means,
   instruction register means for loading said instruction from said control memory means, and decoder means for decoding said instruction.

8. A system as in claim 2 wherein said processor means includes pulse width register means for storing a binary number representative of the width of said control pulses,
   pulse width counter means incrementable once each clock cycle from an initial count and reset to said initial count when said counter means reaches a predetermined count, and comparator means to compare said number stored in said pulse width register means with the count in said pulse width counter means.

9. A system as in claim 8 wherein said processor means include buffer driver means connected to said comparator means for transmitting said control pulses to said power supply whereby said driver means initiates said control pulses at said initial count and terminates said control pulses when said number equals the count in said pulse width counter means.

10. A system as in claim 8 wherein said processor means includes register file means having an error voltage register for storing said error signal during one clock cycle,
   a working register for storing another error signal from another clock cycle,
   and a pulse register for storing a control pulse to be loaded into said pulse width register means.

11. A system as in claim 10 wherein said register file means includes a save register for saving the address in said control memory means of the program to be initiated when the power supply associated with said register is to be serviced.

12. A system as in claim 10 wherein said processor means includes arithmetic logic unit means for computing the difference between said error signal and said another error signal thereby forming a derivative signal and for computing the difference between said control pulse and said derivative signal thereby forming a regulation pulse.

13. A system as in claim 12 wherein said arithmetic logic unit means includes means for computing another difference between said regulation pulse and the sum of said derivative and said another error signal thereby forming a recovery pulse when said another difference exceeds said predetermined count.

14. A system as in claim 13 wherein said control pulses include a proportional pulse for one clock cycle and a derivative pulse for another clock cycle.

15. A digitally controlled power system controlled during timed clock cycles comprising:
   a plurality of power supplies each responsive to a pair of control pulses each having a pulse width providing a controlled output voltage,
   means for sensing a difference between a reference voltage and said output voltage for each power supply, thereby forming an error signal for each power supply,
   digital control processor means connected to receive and process said error signal representative of said difference for each power supply and to provide said pair of control pulses during said clock cycles,
   multiplexer means for sequentially connecting said processor means to each of said power supplies and to said means for sensing, and
   control memory means connected to said processor means to provide a program of instructions to said processor means whereby said processor means provides a programmed change in the width of said control pulses for each power supply such that each power supply provides a change in said output voltage.

16. A system as in claim 15 wherein said multiplexer means includes analog switch means.

17. A system as in claim 15 wherein said processor means includes pulse width register means associated with each power supply for storing said control pulses to be output,
   pulse width counter means incrementable once each clock cycle from an initial count and reset when said pulse width counter means reaches a predetermined count and,
   comparator means associated with each power supply to compare the control pulse stored in said pulse width register means with the count in said pulse width counter means.

18. A system as in claim 17 wherein said processor means includes a register file bank for each power supply wherein each of the register files includes an error voltage register for storing said error signal during one clock cycle, a working register for storing another error signal from a previous clock cycle, a pulse register for storing the control pulses to be output, and a save register for saving the address in said control memory means of the program to be initiated when the power supply associated with said bank is to be serviced.

19. A system as in claim 18 including arithmetic logic unit means for computing the difference for each of said power supplies between said error signal and said another error signal thereby forming a derivative signal and for comparing the difference between a control pulse and said derivative signal thereby forming a regulation pulse, and for computing the difference between said regulation pulse and the sum of said derivative and said another error signal thereby forming a recovery pulse when said recovery pulse exceeds said predetermined count.

20. A system as in claim 19 further including control counter means incrementable once each time said pulse width counter means reaches said predetermined count whereby said control counter means sequentially activates each of said power supplies, comparator means, and pulse width register means.

21. A system as in claim 16 wherein said analog switch means incudes means for independently sequencing the turning on or off of said plurality of power supplies in said power system.

22. A system as in claim 15 wherein said power supplies are adjustable from a remote source.

23. A system as in claim 16 wherein said analog switch means includes a decimal display for visual monitoring of said error signal.

24. A digitally controlled power system controlled during timed clock cycles comprising:
   at least one power supply responsive to one or more control pulses each having a pulse width providing a controlled output voltage,
   means for sensing a difference between a reference voltage and said output voltage whereby said means provides an error signal representative of said difference,
   digital control processor means connected to receive and process said error signal and to provide said control pulses during said clock cycles,
   and control memory means connected to said processor means to provide a program of instructions to said processor means such that said processor means provides a programmed change in the width of said control pulses whereby said power supply provides a change in said output voltage.

25. A system as in claim 24 wherein said processor means includes means for differentiating the leading edge of said control pulses thereby forming a start pulse.

26. A system as in claim 24 wherein said processor means includes means for differentiating the trailing edge of said control pulses thereby forming a stop pulse.

27. A digitally controlled power system controlled during timed system cycles and including at least one power supply responsive to a pair of control pulses each having a pulse width providing a controlled output voltage, the improvement comprising the steps of:
   storing under control of programmed instructions a first error signal comprising the difference between a reference voltage and an output voltage in one clock cycle and storing a second error signal in another clock cycle,
   comparing under control of said instructions said first signal with said second signal thereby forming a derivative signal,
   comparing under control of said instructions said control pulses and said derivative signal thereby forming new control pulses, each with a new pulse width,
   transmitting under control of said instructions said new control pulses during said system cycles to said power supply thereby providing a programmed change in said output voltage in response to said new control pulses.

* * * * *